United States Patent

[11] 3,587,424

[72] Inventors T. O. Paine
Deputy Administrator of the National Aeronautics and Space Administration in respect to an invention of;
Mark J. Olsasky, 22721 Collins St., Woodland Hill, Calif.
[21] Appl. No. 753,974
[22] Filed Aug. 20, 1968
[45] Patented June 28, 1971

[54] LASER CAMERA AND DIFFUSION FILTER THEREFOR
9 Claims, 2 Drawing Figs.

[52] U.S. Cl. ..................................................... 95/11,
331/94.5, 352/84
[51] Int. Cl. ...................................................... G03b41/14,
H01s 3/00
[50] Field of Search ........................................... 95/11, 11.5;
352/84; 331/94.5 (Inquired)

[56] References Cited
UNITED STATES PATENTS
3,154,371 10/1964 Johnson .................... 331/94.5(UX)
3,294,002 12/1966 Vitkine ....................... 352/84(X)
3,366,439 1/1968 Buck et al. ................. 95/11.5(X)
3,438,050 4/1969 Aschenbrenner et al. ... 331/94.5(X)

OTHER REFERENCES

" A True Kerr-Cell Framing Camera" by Hauser et al., SMPTE, June 1962

" Cit Develops Stroboscopic Laser Light", P. S. & E. Vol. 7, May— June 1963

" From Flash Guns to Lasers", by Hood, ELECTRONICS, Aug. 1963

" High Speed Framing Camera for Laser Rod Study" by Bickart, ELECTRONIC COMMUNICATOR, Vol. 1, No. 1, Jan. 1966

" Laser Applications" by Maiman, PHYSICS TODAY, July 1967

Primary Examiner—Samuel S. Matthews
Assistant Examiner—Robert P. Greiner
Attorneys—Monte F. Mott, J. H. Warden and G. T. McCoy ABSTRACT: A laser camera system including a diffusion filter is disclosed. The diffusion filter is a laser light transparent receptacle containing a suspension of small particles having an average diameter larger than the wavelength of the laser light. The suspension is preferably a colloidal suspension of milk or metal particles in water.

PATENTED JUN28 1971

3,587,424

INVENTOR:
MARK J. OLSASKY

LASER CAMERA AND DIFFUSION FILTER THEREFOR

ORIGIN OF THE INVENTION

The invention described herein was made in performance of work under a NASA Contract and is subject to the provisions of Section 305 of the National Aeronautics and Space Act of 1958, Public Law 85-568 (72 State 435; 42 USC 2457).

BACKGROUND OF THE INVENTION

1. Field of the Invention

The present invention relates to an optical filter and more particularly to a diffusion filter for a pulsed laser light source of use in photography.

2. Description of the Prior Art

The light that is emitted from a laser is monochromatic, collimated, coherent, linearly polarized and is highly intense. The high intensity of the laser light permits exposure of a large area of film. The collimated nature of the light makes the laser easily adaptable to a variety of optical systems and the extremely short duration of the light pulse permits high image speeds over the film plane. These properties make the laser a very useful tool in areas involving photographic techniques. Furthermore, a laser, when operated in the pulsed mode, acts both as a light source and a shutter. Therefore, a high-speed laser camera only requires an acceptable optical system and a means of obtaining a physical separation of each frame of the film. Several such cameras have been built and operated, such as the work reported by Ellis, A. T., and Fourney, M. E. 1963, "Applications of a Ruby Laser to High Speed Photography," Proc. Inst. Elect. and Electronic Engineers, 51, 6 pp. 941-942.

Though the use of lasers for high-speed photography light sources in the mode of operation as reported by Ellis et al., has made it possible to photograph phenomena that were heretofore not observable, the coherence of the laser light source causes interference patterns which obscure important details of the event being photographed.

OBJECTS AND SUMMARY OF THE INVENTION

It is therefore an object of the invention to provide improved definition in laser exposed photographs.

Another object of the invention is to provide means for eliminating interference patterns in laser light photography with minimum degradation of the frequency spectrum and intensity of the laser light.

Yet another object of the invention is to provide means for variably controlling the degree of diffusion and attenuation of a laser light source for static and high-speed photography.

These and other objects and many attendant advantages of the invention will become apparent as the description proceeds.

In accordance with the invention, a diffusing medium comprising a stable suspension of small particles having an average diameter larger than the wave length of the laser light source is interposed between the laser light source and a camera to remove the coherence of the laser beam without substantially affecting its other characteristics. If the particles are considerably smaller than the wave length of the laser light, the incident beam will be scattered rather than reflected by the particles. However, when the size of the particles is no longer small compared to the wave lengths of the laser light, ordinary diffuse reflection from the surface of the particles will occur without degradation of the frequency of the laser beam.

It is preferred, according to the invention, to utilize a disperse phase of solid particles in a state of subdivision adapted to form a colloidal suspension in a liquid disperse medium. In a solid-liquid colloidal suspension, the fine particles remain suspended and will not readily settle out. Therefore, homogeneity without external mixing of the suspension is inherently achieved. Suitable colloidal suspensoids according to the invention are prepared by suspending colloidal size particles, such as milk solids or gold particles, in water.

The invention will now become better understood by reference to the following detailed description when considered in conjunction with the accompanying drawings.

DESCRIPTION OF THE PREFERRED EMBODIMENTS

Figure 1:
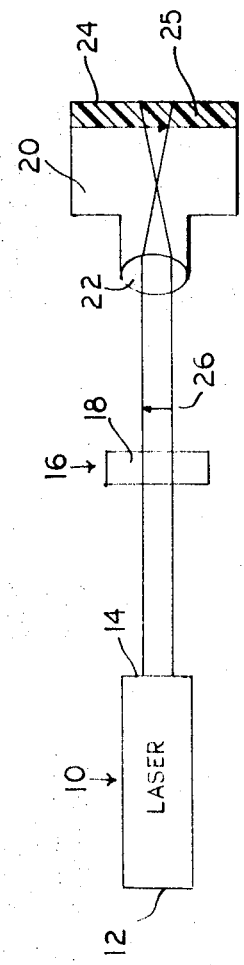
FIG. 1 is a schematic and block diagram view of a photographic system according to the invention.

Referring now to FIG. 1, the laser camera of the invention comprises generally a pulsed laser light source 10 including a totally reflective end face 12 and a partially reflective end face 14. A flat-sided cell 16, transparent to the laser light, containing a colloidal suspension 18 of powdered milk is placed in the light path of the laser 10. A camera 20 is situated to collect the light output from the cell 16 on a lens 22. The lens 22 is a fixed focus lens adapted to form a planar image of the light received from the cell 16 on a film plane 24. Film plane 24 is adapted to receive a sheet of photographic film 25.

When an object 26 is placed within the light path of the laser 10 and a pulse of laser light is projected through the cell 16, a single exposure of the object 26 is produced on the sheet of film 25. It has been found according to the invention that a significant improvement over standard photographic methods is achieved. When the cell 16 is removed and the exposure is repeated, the developed film displays wormlike areas indicating the presence of interference patterns.

When the laser is operated in the free running mode, the output in this mode is irregular and the amplitude varies in a random manner. However, it is still quite useful for taking single pictures. However, for high-speed photography, the random output of the laser must be controlled so that the laser delivers a controlled amplitude pulse of constant duration on command. Furthermore, there is a characteristic delay in order to reach population inversion after the laser is pumped with an external flash of light. This must be considered in the successful operation of a high-speed framing camera. The general method utilized in the art for controlling the laser output is by Q-spoiling. A typical Q-spoiling technique is to insert a Kerr cell in the cavity. The Kerr cell can be pulsed to key the laser to generate a series of spaced time pulses required for high-speed photography.

Figure 2:
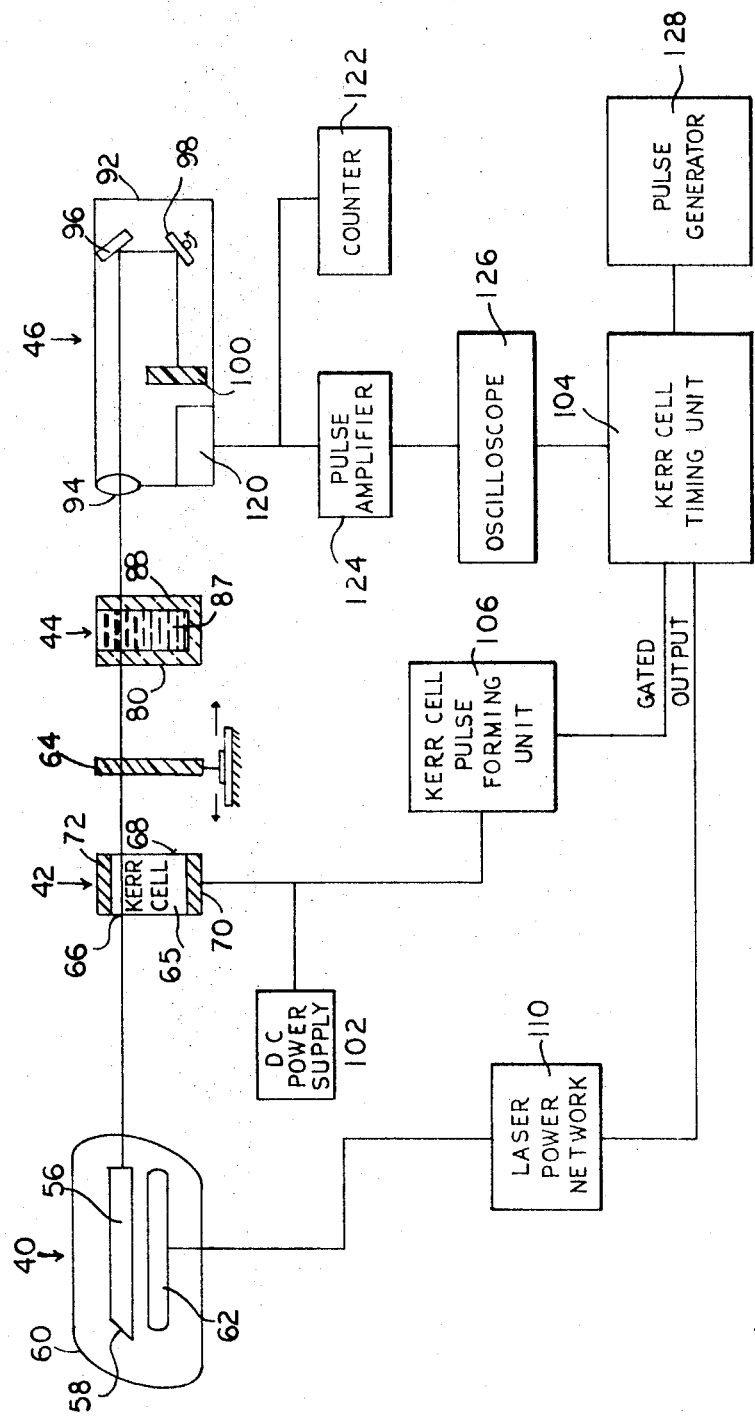
FIG. 2 is a schematic view of a high-speed laser camera system according to the invention.

Referring now to FIG. 2, a high-speed framing camera system includes a pulsed laser 40 having a Kerr cell 42 inserted within the laser cavity, a diffusion filter-cell 44, a high-speed framing camera 46 and the associated means to synchronize these elements.

The active material for the laser is a ruby rod 56 having one end cut in a wedge 58 so that the light propagating along the rod 56 is reflected in a direction parallel to the incoming ray. The ruby rod 56 is positioned at one focus of a highly polished cavity 60 of elliptical cross section. A xenon light pump 62 is positioned at the other focus of the cavity. A Fabry-Perot interferometric cavity is formed between the wedge end 58 of the ruby rod 56 and a movable external dielectric partially transparent mirror 64.

The Kerr cell comprises a container filled with a liquid 65 that becomes doubly refracting when subjected to an electrical field. A typical liquid is nitrobenzene. The container has radiation transparent end walls 66 and 68 and a set of electrodes 70 and 72 are oppositely disposed along two other walls of the container.

A filter cell 44 having flat radiation transparent end walls 80 and 88 is positioned across the light path of the laser. The cell contains a translucent colloidal suspension 87 of powdered milk particles in water.

The high-speed framing camera 46 comprises a light opaque enclosure 92 containing a lens system 94 which collects the incoming rays and focuses them on a fixed mirror 96. The rays are reflected from the mirror 96 onto a rotating reflector 98.

On each revolution of the reflector 98, image-forming rays are imaged on a film plane 100. High-speed framing cameras are readily available and the mirror may be motor driven, or turbine driven as in the Beckman and Whitley Model No. 200 High Speed Framing Camera.

With the Kerr cell inserted in the laser cavity, the direction of the polarized light which is propagating in the cavity is rotated and this effectively increases the cavity loss coefficient. When the electrical field of the Kerr cell is turned on to its quarter-wave value by energizing the electrodes the polarization of the laser light which passes twice through the cell is rotated 90° from the favored plane of polarization. In this situation, regeneration is insufficient for oscillations until a much higher level of excitation is reached than is required for oscillations with the Kerr cell absent. To produce a single pulse, the Kerr cell is activated. The exciting flash lamp is then fired and after a short interval, the Kerr cell is suddenly turned off in a time less than about 0.02 microseconds. The resulting pulse shape is reproducible.

A periodic pulse train is obtained by switching the Kerr cell at suitably chosen intervals. The Kerr cell is operated by impressing a biasing voltage from DC power supply 102 across the electrodes 70 and 72, and it is pulsed by rapidly reducing the biasing voltage to 0 on command from a pulse forming unit 106 which generates pulses varying from about 350 kilocycles to 1.66 megacycles. These pulses modulate the DC power supply 102 to the plates in the Kerr cell. A timing unit 104 is utilized to generate a gated output to trigger the laser power network 110 and the Kerr cell pulse forming unit 106. The timing unit is triggered by the synchronization electronics associated with the rotating mirror 98. The rotation of the mirror at a time, $t_o$, is sensed by a magnetic pickup 120. The signal from magnetic pickup 120 is converted into a pulse by counter 122 and this pulse amplified in pulse amplifier 124. The amplified pulse is applied to an oscilloscope 126 operating in a single sweep mode to generate reliable timing signals. These timing signals and pulses form a pulse generator 128 are utilized as inputs to the timing unit 104. The timing unit 104 initiates the sequence of energizing the laser power network 110 and pulsing the Kerr cell to key the laser to deliver pulses synchronized to the position of the rotating mirror.

The laser power network energizes the flash lamp by delivering at least 160 joules of energy to the flash lamp 62. The flash lamp duration is about 1 millisecond. During the flash lamp duration, the voltage across the Kerr cell electrodes is reduced to 0 voltage by each pulse from the Kerr cell pulse forming unit. Due to the delay in reaching threshold for the laser, the flash lamp is first energized while the Kerr cell biasing voltage is impressed on the Kerr cell electrodes. After population inversion has been reached, the Kerr cell is pulsed to key the laser to deliver a controlled amplitude and pulsed output.

A suitable active material for the laser is a 3-inch long, ¼-inch diameter total internal reflection ruby rod doped with 0.05 percent $Cr^{+3}$ ions. An EGG FX–42 xenon flash tube can be utilized as the pumping source for the laser. A total reflector is formed at one end of the ruby rod and an external dielectric mirror having 90 percent reflection at 6934 A. forms the other side of the Fabry-Perot interferometric cavity. The cavity length can be varied by adjusting the position of the dielectric mirror so that the space in between the mirrors is varied between 24 to 54 centimeters. The pumping circuit for the FX–42 flash lamp delivers more than the minimum threshold energy of 160 joules and usually less than about 1300 joules.

The Kerr cell is typically filled with nitrobenzene and is operated at a voltage of about 10 kv. The duration of the Kerr cell pulse when varied between 0.1 microsecond to 0.4 microsecond had a rise time of approximately 20 nsec. The rise time of this laser is approximately 10 nsec and has a duration of another 20 nsec for a total pulse duration of about 30 nsec. 70 controlled amplitude pulses of light at 1.5 mc. can be achieved under these conditions. From the pulse train generated by the Kerr cell Q-spoiling technique, it has been found that the pulse amplitude repetition rate is a function of cavity length. The amplitude of the pulse has been found to decrease with increasing cavity length. The duration of the pulse appears to be only dependent on the active material utilized, the pumping power developed in the flash lamp and the efficiency of Q-apoiling.

Since the sensitivity of ordinary photographic film is quite poor in the region of 7000 A., special types of film must be utilized. It has been found that Kodak 103–F Spectrographic film which has a long density of 0.8 at 7000 A. is quite acceptable for producing photographs according to the invention.

With the Kerr cell operating in the disclosed mode to pulse a ruby laser as described, controlled pulses at repetition rates of over 1.6 M/sec. have been achieved. The pulse duration of approximately 30 seconds can be utilized to expose photographic film at rates of over 1.2 million frames per second.

A Beckman and Whitely Model 200 camera was operated with its turbine driven mirror rotating at about 1600 r.p.s. The camera was synchronized with a ruby laser which was pulsed at a rate of $2\times10^5$ pulses per second for 150 microseconds. The definition achieved exceeds that possible in previous tests without a diffusion filter according to the invention.

It is to be understood that the foregoing relates only to preferred embodiments of the invention and that numerous substitutions, modifications, and alterations are permissible without the departing from the scope of the invention as defined in the following claims.

I claim:

1. A photographic system comprising in combination:
   source means for forming a pulse of monochromatic, collimated, coherent and highly intense light along an optical path;
   camera means disposed along the optical path of said light pulse; and
   filter means interposed between said source means and said camera means for diffusing said pulse of light comprising a container transparent to said light having flat end walls normal to said light path, said container enclosing a suspension of solid, colloidal particles in a liquid, said particles having an average diameter greater than the wavelength of the light.

2. The system according to claim 1 in which said suspension is a translucent, colloidal suspension of milk particles in water.

3. The system according to claim 1 in which said source means is a pulsed laser.

4. The system according to claim 3 in which laser is a pulsed ruby laser and said system includes a pulsed Q-spoiling means for pulsing said laser.

5. A system according to claim 4 in which said pulsed Q-spoiling means comprises a Kerr cell.

6. A system according to claim 1 in which said camera includes a rotating mirror and a film plane;
   said mirror projecting multiple exposures of an event to be photographed on said film plane.

7. A system according to claim 1 in which said colloidal suspension is a suspension of metal particles in liquid.

8. A method of recording an object comprising steps of:
   forming a pulse of laser light;
   passing said pulse through a diffusing medium consisting essentially of a colloidal suspension of metal particles in liquid, the particles having an average diameter greater than the wavelength of the light to diffuse said light;
   illuminating said object with said diffused laser light; and
   forming a record of said illuminated object on a light sensitized recording element.

9. A method according to claim 8 in which said metal is gold and said liquid is water.